(12) United States Patent
Graff et al.

(10) Patent No.: US 7,738,758 B1
(45) Date of Patent: Jun. 15, 2010

(54) COMPACT OPTICAL SPLITTER MODULE

(75) Inventors: Ludwig C Graff, Ellicott City, MD (US); Vijay Jain, West Friendship, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 10 days.

(21) Appl. No.: 12/331,655

(22) Filed: Dec. 10, 2008

(51) Int. Cl.
*G02B 6/00* (2006.01)
(52) U.S. Cl. ..................................................... 385/135
(58) Field of Classification Search ................... 385/135
See application file for complete search history.

(56) References Cited

U.S. PATENT DOCUMENTS

2008/0175553 A1* 7/2008 Hendrickson et al. ....... 385/135
2009/0074370 A1* 3/2009 Kowalczyk et al. ......... 385/135

* cited by examiner

*Primary Examiner*—Jerry T Rahll

(57) ABSTRACT

A device may include an input cable for receiving optical signals from a feeder cable, output cables for transmitting optical signals to a distribution cable, and a housing. The housing may include an optical splitter for splitting an input beam into a plurality of output beams, an input fiber segment for conveying the input beam from the input cable to the optical splitter, the input fiber segment excluding fiber loop slack, and output fiber segments for conveying the output beams from the optical splitter to the output cables using MT-APC connectors.

16 Claims, 7 Drawing Sheets

COMPACT OPTICAL SPLITTER MODULE

BACKGROUND INFORMATION

Many fiber distribution hub vendors offer preconfigured fiber distribution hubs with space to hold splitter modules of specific sizes. A splitter module is a component used within a fiber distribution hub to split an optical beam from an optical fiber (e.g., a fiber in a feeder cable from a service provider) into multiple optical beams, and output the split beams to multiple optical fibers (e.g., fibers that connect to cables that provide the service to consumers). Since a splitter module from one fiber distribution hub vendor may not fit in a fiber distribution hub from a different vendor, a purchaser may be compelled to procure both a fiber distribution hub and splitter modules from the same vendor.

DETAILED DESCRIPTION OF PREFERRED EMBODIMENTS

The following detailed description refers to the accompanying drawings. The same reference numbers in different drawings may identify the same or similar elements.

As described below, a small/compact splitter module that does not include optical fiber-loop slack may be constructed. Such small splitter modules may be used in a space-efficient indoor fiber distribution hub to save installation and optical fiber cabling cost (e.g., 40% savings in time/cost). In addition, splitter module designs with the smallest form factor may facilitate standardization of splitter module size, and may spur production of splitter modules that may be used in fiber distribution hubs from different vendors.

Figure 1:
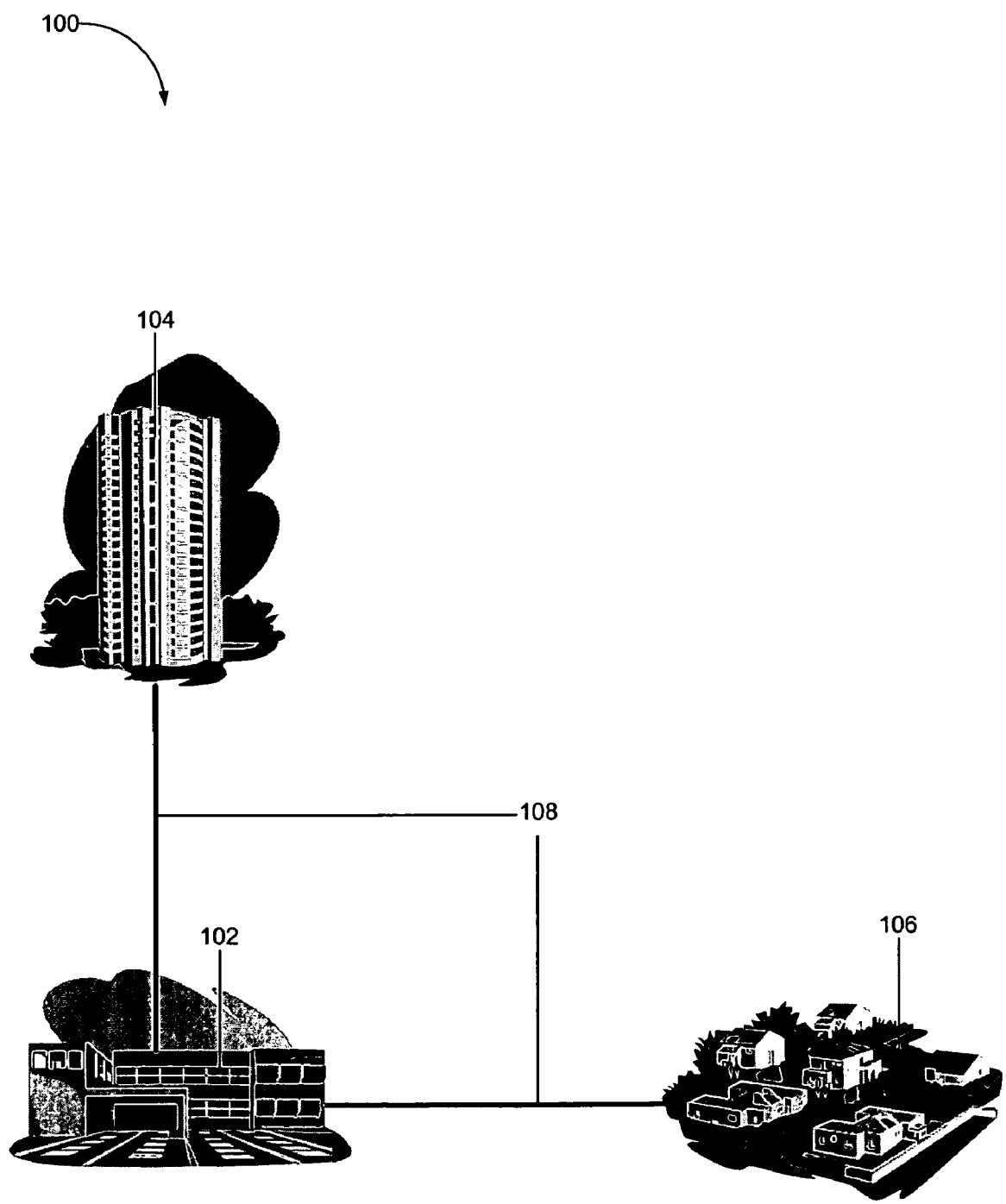
FIG. 1 shows an exemplary optical network in which concepts described herein may be implemented.

FIG. 1 shows an exemplary optical network 100 in which the concepts described herein may be implemented. As shown, optical network 100, which may be sometimes referred to as a fiber-to-the-premises (FTTP) network, may include a central office 102, a multiple dwelling unit complex 104, a single dwelling unit complex 106, and feeder optical fiber cables 108. An actual optical network may include may include additional, fewer, or different dwelling complexes and components than optical network 100.

Central office 102 may include a site that houses telecommunication equipment, including switches, optical line terminals, etc. Central office 102 may provide telecommunication services to subscribers, such as telephone service, access to the Internet, cable television programs, etc., via optical line terminals.

Multiple dwelling unit complex 104 may include apartments, condominiums, and/or other types of living units that are aggregated in a high-rise or another type of building. Single dwelling unit complex 106 may include attached town houses, single detached houses, condominiums, and/or other types of horizontally aggregated living units.

Feeder optical fiber cables 108 may include optical fiber cable bundles that interconnect multiple dwelling unit complex 104 and/or single dwelling unit complex 106 to optical line terminals in central office 102.

Figure 2:
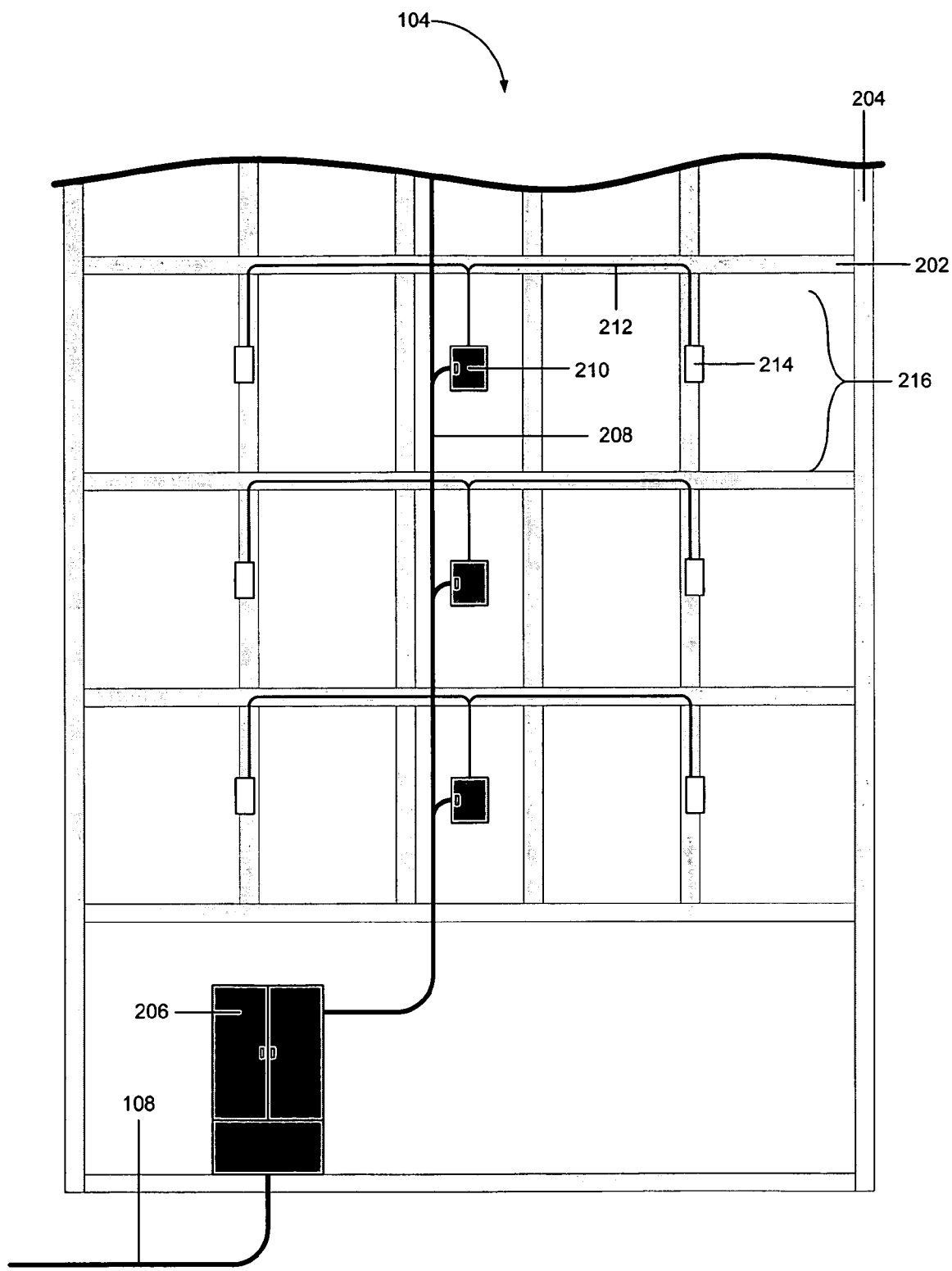
FIG. 2 is a block diagram of a portion of an exemplary multiple dwelling unit complex.

FIG. 2 is a diagram of a portion of an exemplary multiple dwelling unit complex 104. As shown, multiple dwelling unit complex 104 may include a floor/ceiling 202, a wall 204, a fiber distribution hub 206, a distribution cable bundle 208, a fiber distribution terminal 210, a drop cable 212, a optical network terminal 214, and a living unit 216. In FIG. 2, some components of multiple dwelling unit complex 104 are omitted for the sake of simplicity in illustration (e.g., stairs, doors, elevators, etc.). In addition, depending on the implementation, multiple dwelling unit complex 104 may include additional, fewer, or different components than those illustrated in FIG. 2. For example, in some implementations, fiber distribution terminal 210 may be connected to fiber distribution hub 206 through another component, such as a collector box that receives ribbon cables, and provides the ribbon cables connectivity to fiber distribution terminals.

Ceiling/floor 202 and wall 204 may partition space within multiple dwelling unit complex 104 into multiple living units. Fiber distribution hub 206 may include an enclosure (e.g., a plastic or metal cabinet) to receive feeder optical fiber cables 108, split an optical signal on an optical fiber within optical fiber cables 108 into multiple optical signals, convey the split optical signals to fiber distribution cables, collect the fiber distribution cables into distribution cable bundle 208, and provide distribution cable bundle 208.

Distribution cable bundle 208 may include riser cables that carry optical fibers from fiber distribution hub 206 to fiber distribution terminal 210. In some implementations, distribution cable bundle 208 may be tapered as it is routed vertically through multiple dwelling unit complex 104 and as fiber distribution cables are branched from distribution cable bundle 208 to feed into one or more of fiber distribution terminal 210. Fiber distribution terminal 210 may include an enclosure to receive a fiber distribution cable from distribution cable bundle 208.

Drop cable 212 may include optical fiber that carries an optical signal from a fiber distribution cable in fiber distribution terminal 210 to optical network terminal 214. Typically, drop cable 212 may be installed in a raceway that is placed along the ceiling of a hallway, in a conduit, in a duct, etc.

Optical network terminal 214, which may also be called optical network unit 214, may receive optical signals via drop cable 212 and convert the received optical signals into electrical signals that are further processed or carried over, for example, copper wires to one or more living units. In some implementations, optical network terminal 214 may be placed within a living unit, and devices that use services offered by central office 102 may be directly connected to optical network terminal 214.

Living unit 216 may include a partitioned space that a tenant or an owner of the living unit 216 may occupy. Living unit 216 may house devices that are attached directly or indirectly, via copper wires, to optical network terminal 214 to receive services that central office 102 provides.

Figure 3:
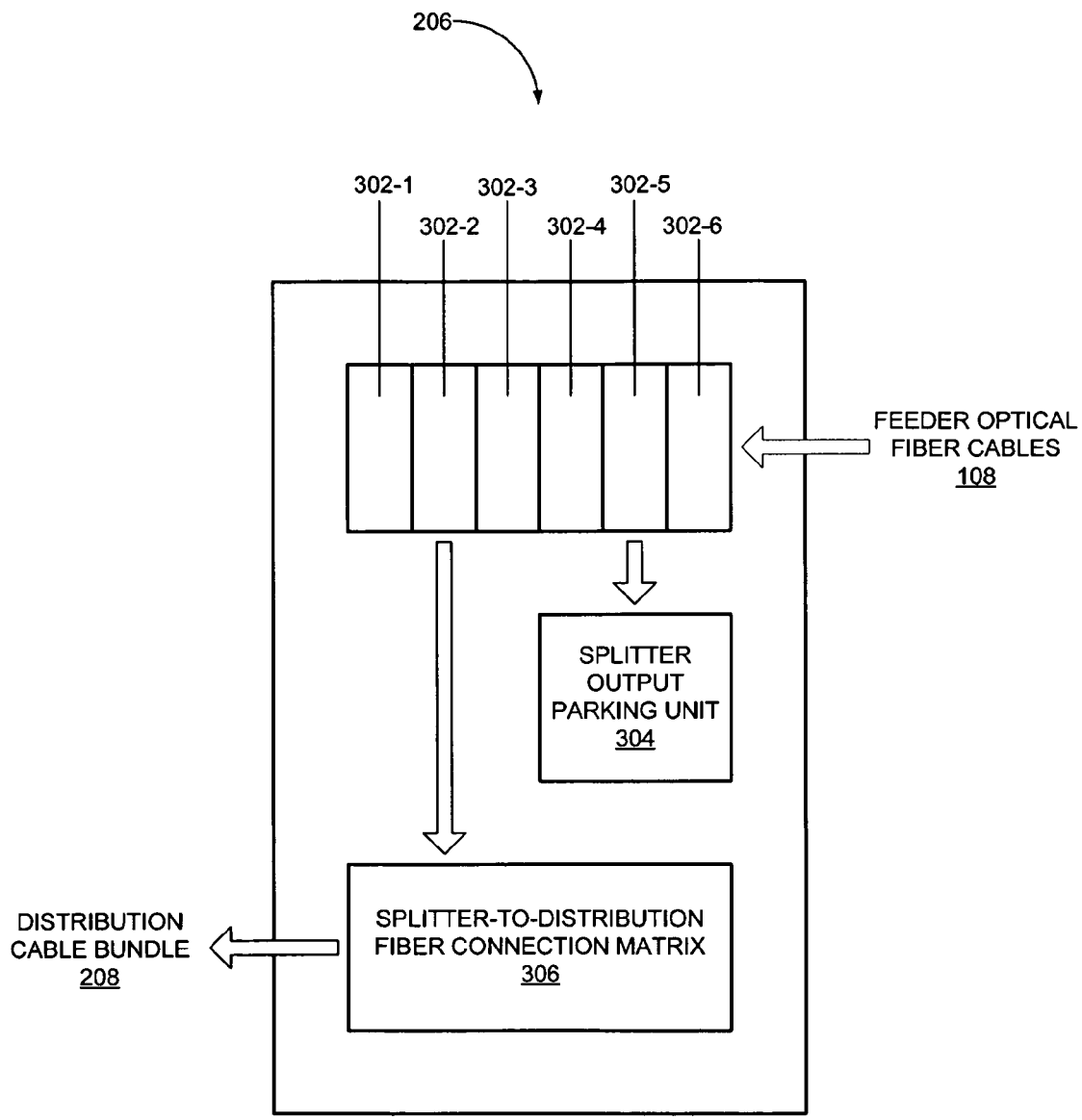
FIG. 3 is a functional block diagram of an exemplary fiber distribution hub of FIG. 2.

FIG. 3 is a functional block diagram of fiber distribution hub 206. As shown, fiber distribution hub 206 may include splitter modules 302-1 through 302-6 (herein individually and collectively referred to as splitter modules 302 and splitter module 302, respectively), splitter output parking unit 304, and splitter-to-distribution fiber connection matrix 306. Depending on the implementation, fiber distribution hub 206 may include additional, fewer, or different functional components than those illustrated in FIG. 3. For example, in some implementations, fiber distribution hub 206 may not include splitter output parking unit 304.

Splitter module 302 may include an assembly of an optical splitter and optical fiber cables. Splitter module 302 may receive an optical signal over an input cable, split the beam into multiple optical signals, and transmit the multiple optical signals via ribbon cables that are connected to the optical splitter.

In FIG. 3, an input cable of splitter module 302 may be attached to a fiber cable from feeder optical fiber cables 108. In one implementation, feeder optical fiber cables 108 may enter fiber distribution hub 206 from the bottom or lower portion, be routed about fiber distribution hub 206, and provide an optical fiber cable that is mated to an input cable of splitter module 302 via connectors and an adaptor.

Splitter output parking unit 304 may include slots in which ribbon cables from splitter modules 302 may be parked until the ribbon cables are attached to fiber distribution cables to provide signal pathways to the living units in multiple dwelling unit complex 104.

Splitter-to-distribution fiber connection matrix 306 may include a mechanism (e.g., fiber optic patch panel) to hold adaptors via which connectors at ends of ribbon cables from splitter modules 302 and connectors at fiber distribution cable ends are adjoined.

Figure 4:
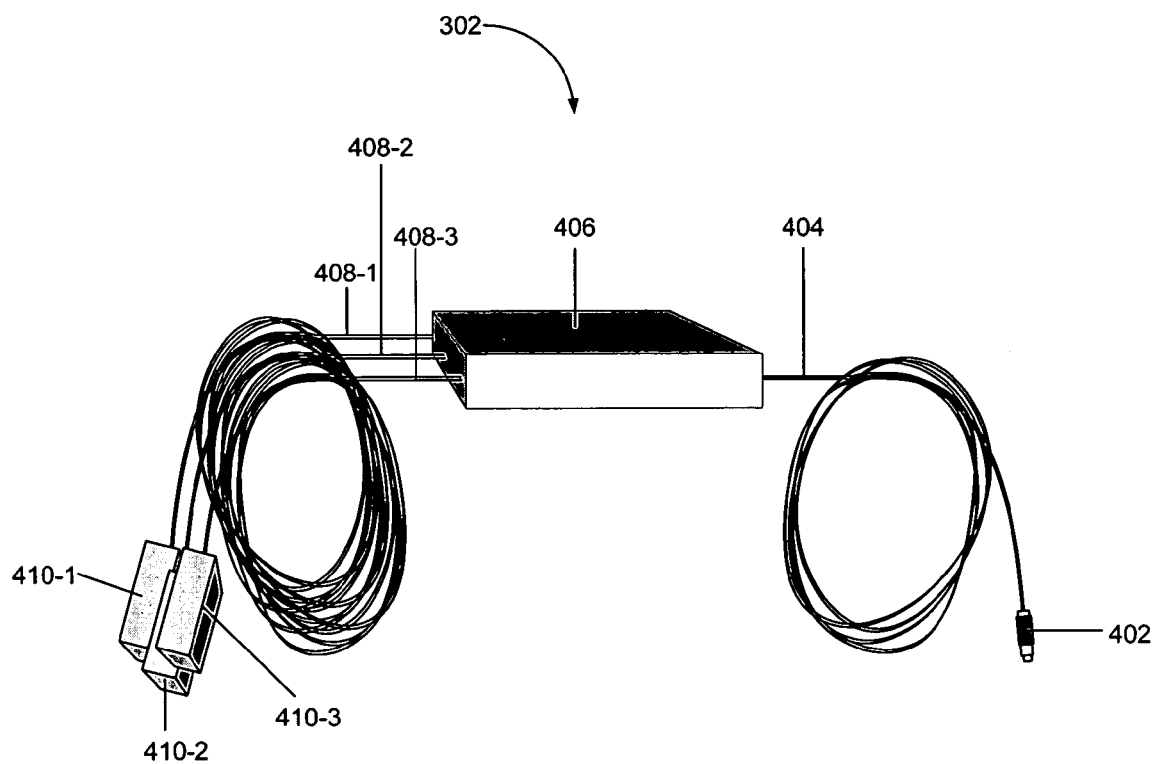
FIG. 4 illustrates an exemplary splitter module of FIG. 3.

FIG. 4 illustrates splitter module 302 according to one exemplary implementation. As shown, splitter module 302 may include a connector 402, an input cable 404, a splitter container 406, ribbon cables 408-1 through 408-3 (herein collectively and individually referred to as ribbon cables 408 and ribbon cables 408, respectively), and connectors 410-1 through 410-3 (herein collectively and individually referred to as connectors 410 and connector 410, respectively). Depending on the implementation, splitter module 302 may include additional, fewer, or different components (e.g., additional ribbon cables 408, connectors 410, etc.) than those illustrated in FIG. 4.

Connector 402 may include a component to encase a fiber end such that the fiber is axially aligned with the optical signaling path in another component to which connector 402 is coupled (e.g., a optical fiber cable, a waveguide, etc.). Examples of connector 402 may include a subscriber connector (SC), SC-angle polished connector (SC-APC), etc. In some implementations, such as in APC connectors, a ferrule (e.g., a ceramic holder for the optical fiber end) and the fiber end are polished at an angle to reduce internal reflection of the optical signal where the optical fiber is coupled to the other component.

Input cable 404 may encase an optical fiber segment that extends from connector 402 to an optical splitter housed in splitter container 406. In some implementations, input cable 404 may have a fiber that has a functional bend radius of less than or equal to 10 millimeters (mm). Splitter container 406 may contain splitter components that split an optical signal from input cable 404 into multiple optical signals and output the multiple optical signals via ribbon cables 408.

Ribbon cable 408 may encase one or more optical fiber segments that extend from the optical splitter housed in splitter container 406 to connectors 410. Each ribbon cable 408 may encase multiple optical fiber segments. For example, in one implementation, ribbon cables 408-1, 408-2, and 408-3 may encase 12, 12, and 8 optical fibers, respectively.

Connector 410 may include a component to encase fiber ends such that the fibers are axially aligned with the optical signaling paths in a component to which connector 410 couples (e.g., a ribbon cable). Examples of connector 410 may include a mechanical transfer-APC (MT-APC). Such a connector may be mated to another connector attached to a distribution cable running to one of the floors in multiple dwelling unit complex 104. Depending on the number of cable drops per floor, connector 410 may be implemented as 4-fiber, 8-fiber, or 12-fiber MT-APC connector. The 4-fiber, 8-fiber, or 12-fiber MT-APC may allow, respectively, 4, 8, and 12 cables to be dropped on a floor in a single distribution cable run. A connector 410 that is not attached a distribution cable may be parked at splitter output parking unit 304.

In splitter module 302, splitter container 406 may not include optical fiber-loop slack. Consequently, splitter module 302 may be constructed to be smaller than a splitter module that includes optical fiber loop slack (e.g., 70% smaller). Input cable 404 and ribbon cables are located on the back and front sides of splitter container 406, and therefore, when splitter container 406 is placed inside fiber distribution hub 206, splitter input/outputs may be accessible from the front and back of fiber distribution hub 206.

Figure 5A:
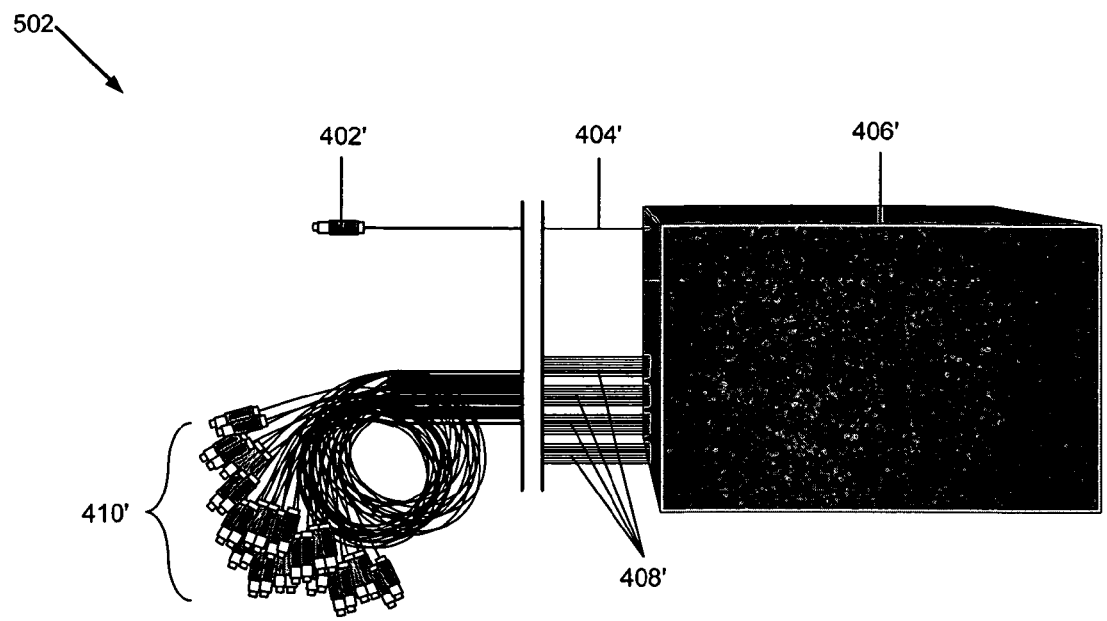
FIG. 5A is a diagram of another exemplary splitter module of FIG. 3.

FIG. 5A shows one implementation of a splitter module 502 that includes optical fiber loop slack. As shown, splitter module 502 may include components that correspond to each of the components illustrated in FIG. 4. In FIG. 5A, components that correspond to those in FIG. 4 are labeled with the same numbers, but with an apostrophe. The components illustrated in FIG. 5A may operate similarly as the corresponding components described with respect to FIG. 4.

In contrast to splitter module 302 in FIG. 4, splitter module 502 may include splitter container 406' that is larger than splitter container 406, as splitter container 406' includes fiber loop slack. In addition, whereas each of ribbon cables 408 shown in FIG. 4 encases multiple optical fibers, each of output fiber cables 408' in FIG. 5A encases a single optical fiber.

Figure 5B:
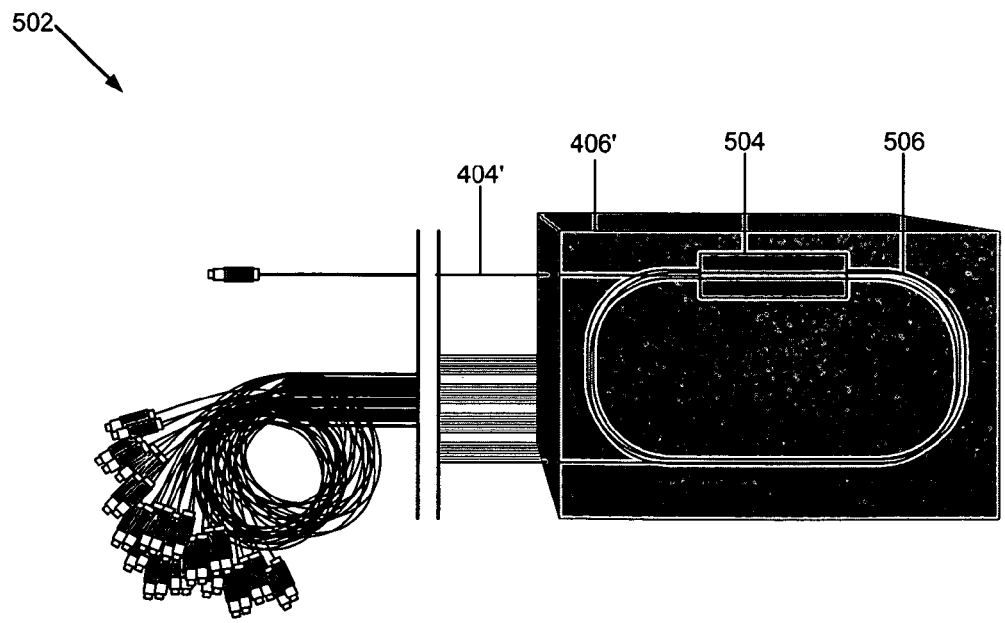
FIG. 5B is a diagram illustrating exemplary contents of a splitter container of FIG. 5A.

FIG. 5B is a diagram that illustrates exemplary contents of splitter container 406'. As shown, splitter container 406' may include an optical splitter 504 and fiber loop slack 506. In an actual implementation, splitter container 406' may include additional or different components than those illustrated in FIG. 5B.

Optical splitter 504 may include a component to receive input cable 404' and provide multiple output cables 408', which, in one implementation, may include jacketed 1.6-3 mm fiber cables that are terminated with SC-APC connectors. Optical splitter 504 may split an optical signal received via input cable 404' into multiple optical signals and output the multiple optical signals via output cables 408'. Optical splitter 504 may be small compared to the overall size of splitter container 406', whose size may be governed by fiber loop slack 506.

Fiber loop slack 506 may include a portion of input cable 404' that is wound into one or more loops before input cable 404' enters optical splitter 504. In addition, fiber loop slack 506 may include a portion of output cables 408' that are wound into one or more loops before output cables 408' exit splitter container 406'. In FIG. 5B, only one output cable is illustrated as exiting optical splitter container 406'. The size of fiber loop slack 506 may depend on the type of optical fibers in input cable 404' and output cables 408'.

Typically, splitter container 406' may include fiber loop slack 506 for a number of reasons. For example, if optical splitter 504 is located close to an optical signal source (e.g., laser), in terms of relative distance that the optical signal travels from the source to optical splitter 504, the optical signal at optical splitter 504 may be distorted. Including fiber loop slack 506 may increase the distance between the source and optical splitter 504, and therefore, may eliminate the distortion.

In another example, if optical splitter 504 is located in an outdoor fiber distribution hub, optical splitter 504 may be exposed to climate changes. At low or high temperatures, input cable 404' and/or output cable 408' may contract/expand relative to the encased optical fiber(s). In such instances, without fiber loop slack 506, the encased optical fibers may bend at various points on input and output cables 404' and 408'.

In yet another example, a technician who is troubleshooting fiber distribution hub 206 that contains splitter module 302 may accidentally yank or pull on input cable 404' or output cables 408'. In such instances, without fiber loop slack 506 to absorb excess strain, connections between waveguides within optical splitter 504 and the optical fibers in input/output cables 404'/408' may weaken or break.

Unlike splitter module 502, however, because splitter module 302 may be used in a fiber distribution hub 206 that is not exposed to significant climate changes/outside elements and is distant from a signal source, splitter container 406 in splitter module 302 may exclude fiber loop slack. Consequently, splitter module 302 may be constructed smaller than splitter module 502 (e.g., smaller by 70%).

Figure 6A:
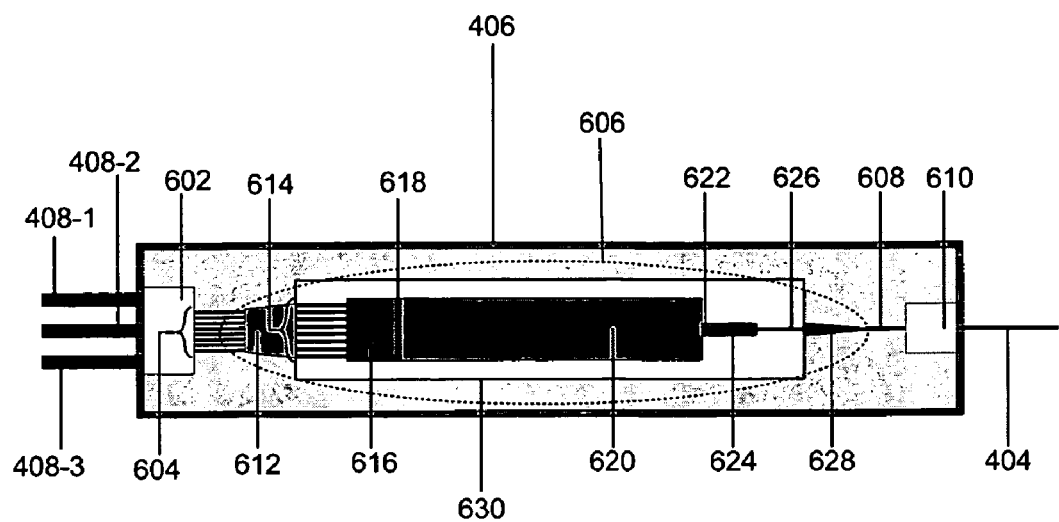
FIG. 6A is a cross-sectional view of a splitter container of FIG. 4 according to an exemplary implementation.

FIG. 6A is a cross-sectional view of splitter container 406 according to an exemplary implementation that excludes fiber loop slack. As shown, splitter container 406 may include a fan-out unit 602, N-fiber ribbon cables 604, an optical splitter 606, an input cable 608, and a fan-out unit 610. Depending on the implementation, splitter container 406 may include additional, fewer, or different components than those illustrated in FIG. 6A. For example, in one implementation, splitter container 406 may include fan-out unit 602 or fan-out unit 610 that partly protrudes from splitter container 406.

Fan-out unit 602 may include a component that receives N-fiber ribbon cables 604, regroups/connects optical fibers in N-fiber ribbon cables 604 to optical fibers in ribbon cables 408, and provides ribbon cables 408. For example, in one implementation, fan-out unit 602 may receive 8 of 4-fiber ribbon cables, and regroups optical fibers in two 12-fiber ribbon cables (e.g., ribbon cable 408-1 and ribbon cable 408-2) and one 8-fiber ribbon cable (e.g., ribbon cable 408-3).

Each of N-fiber ribbon cables 604 may encase N optical fiber segments.

Optical splitter 606 may include a component (e.g., a planar lightwave circuit (PLC) chip) to split an optical signal on input cable 608 into a predetermined number of optical signals (e.g., 8, 16, 32, 64, etc. signals) and route the split signals into optical fibers that feed into N-fiber ribbon cables 604.

Input cable 608 may encase an optical fiber segment. Fan-out unit 610 may include a component that receives input cable 404, and routes/connects the optical fiber in input cable 404 to input cable 608.

In the above, fan-out units 602 and 610 may also affix or hold ribbon cables 408 and input cable 404, respectively, to splitter container 406 such that pulling at ribbon cables 408 or input cable 404 does not easily damage or detach optical fibers in ribbon cables 408/input cable 404 from optical splitter 606. This may aid in eliminating a need for fiber loop slack 506 to protect optical splitter 606.

In such implementations, fan-out units 602 and 610 may use epoxy to hold ribbon cables 408 and input cable 408, respectively.

Figure 6B:
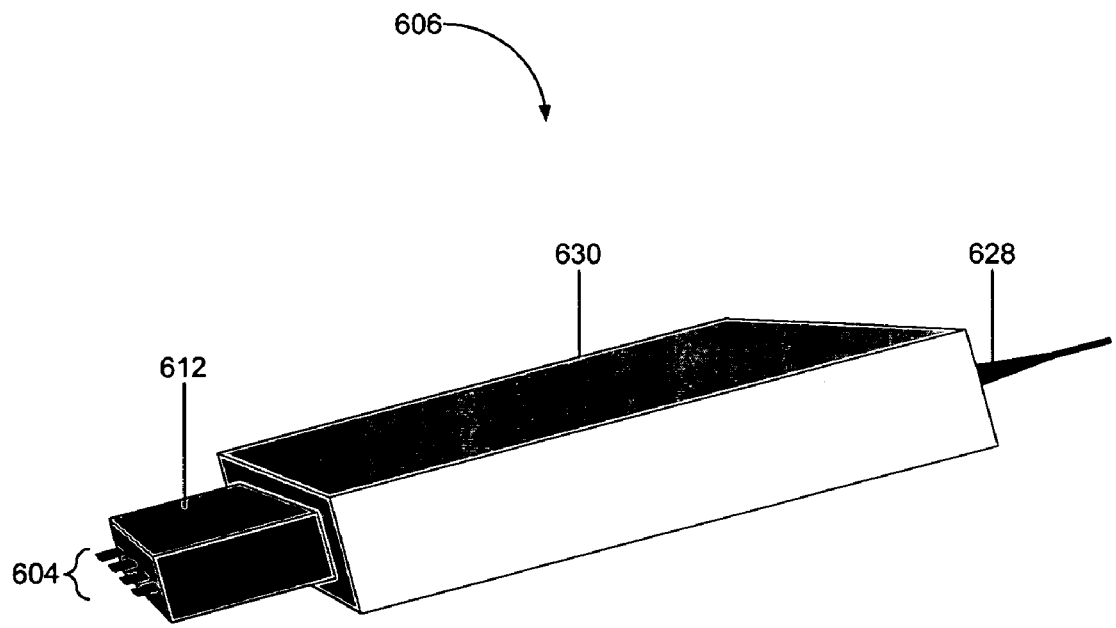
FIG. 6B shows a perspective view of an optical splitter of FIG. 6A.

As further shown in FIG. 6A, optical splitter 606 may include a stress absorbing unit 612, N-fiber ribbon cable segments 614, a fiber array 616, adhesive 618, a substrate 620, adhesive 622, a fiber array 624, an input cable segment 626, a stress absorbing unit 628, and a splitter housing 630. Some of these components may be spatially arranged as illustrated in FIG. 6B, which shows a perspective view of optical splitter 606. In other implementations, optical splitter 606 may include additional, fewer, or different components than the ones illustrates in FIG. 6A. and/or 6B.

Stress absorbing unit 612 may include a component through which N-fiber ribbon cables 604 from splitter housing 630 are guided toward fan-out unit 602. Stress absorbing unit 612 may be securely attached to or integrally formed with splitter housing 630, and may include material that protects N-fiber ribbon cables 604 against bending at angles that may break or damage the optical fiber segments encased in N-fiber ribbon cables 604. In some implementations, optical splitter 606 may not include stress absorbing unit 612.

N-fiber ribbon cable segments 614 may include portions of N-fiber ribbon cables 604, and may extend from an inner wall of splitter housing 630 to fiber array 616. Fiber array 616 may include a component that aligns each of optical fibers in N-fiber ribbon cable segments 614 to waveguides constructed in substrate 620. V-grooves that are formed in fiber array 616 may precisely position the optical fibers, which are fitted within the V-grooves, to meet the waveguides such that optical signals from the waveguides may propagate to the optical fibers in N-fiber ribbon cable segments 614.

Adhesive 618 may affix/fuse fiber array 616 to substrate 620. Substrate 620 may include waveguides that extend from fiber array 624 to fiber array 616. Depending on the implementation, the waveguides may split an optical signal from the optical fiber in input cable segment 626 into, for example, 8, 16, 32, 64, etc., optical signals that exit substrate 620 through optical fibers in N-fiber ribbon cable segments 614. Adhesive 622 may affix/fuse fiber array 624 to substrate 620.

Fiber array 624 may include a component that aligns the optical fiber in input cable segment 626 to waveguides constructed in substrate 620. A V-groove that is formed in fiber array 624 may precisely position the optical fiber, which is fitted within the V-groove, to meet the waveguides such that optical signals from the optical fiber in input cable segment 626 may propagate to the waveguides. Input cable segment 626 may include a portion of input cable 608, and may extend from fiber array 624 to an inner wall of splitter housing 630.

Stress absorbing unit 628 may include a component through which input cable 608 from splitter housing 630 is guided toward fan-out 610. Stress absorbing unit 628 may be securely attached to or integrally formed with splitter housing 630, and may protect input fiber 608 from bending at angles that may break or damage the optical fiber segment encased in input cable 608. In some implementations, splitter container 406 may not include stressing absorbing unit 628.

Splitter housing 630 may protect components 614-626 contained within splitter housing 630 from outside forces/elements and secure components 614-626 in proper locations.

In some implementations, additional stress absorbing units may be fixedly placed outside of splitter container 406. about ribbon cables 408 and input cable 404. to provide additional support for ribbon cables 408 and input cable 404 against external forces (e.g., a tug/pull).

Figure 7:
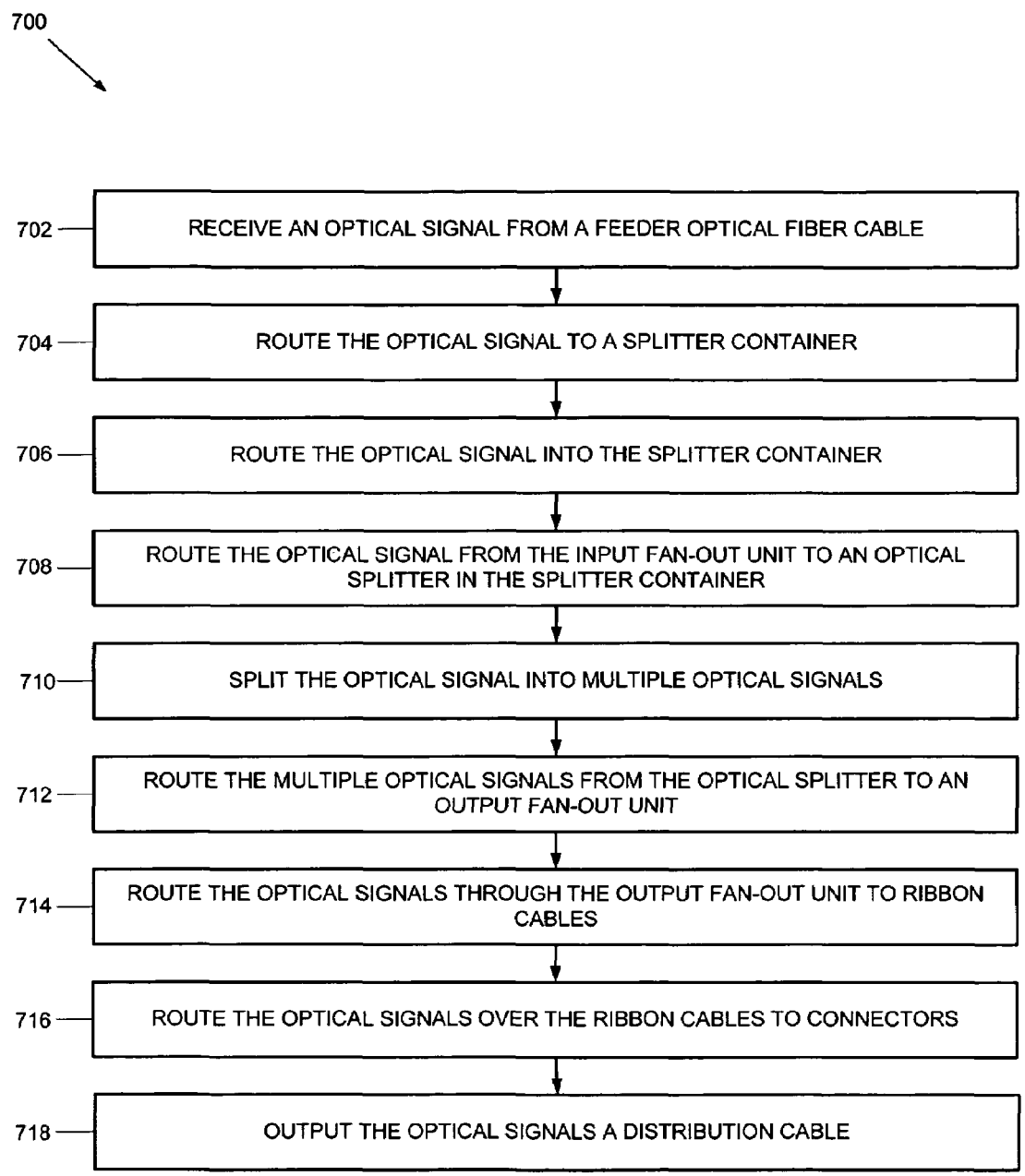
FIG. 7 is a flowchart of an exemplary process that is associated with operation of the splitter module of FIG. 3.

FIG. 7 is a flow diagram of an exemplary process 700 that is associated with operation of splitter module 302. Process 700 may start when splitter module 302 receives an optical signal from a feeder optical fiber cable (block 702). For example, splitter module 302 may receive the optical signal from one of feeder optical fiber cables 108 (FIG. 1) via a connector, such as a SC-APC connector.

An input cable may route the optical signal to a splitter container of the splitter module (block 704). For example, input cable 404 may route the optical signal to splitter container 406.

An input fan-out unit may route the optical signal into the splitter container (block 706). For example, fan-out unit 610 may receive input cable 404 and route/connect input cable 404 to input cable 608. Consequently, the optical signal may be routed into splitter container 606.

An input cable segment may route the optical signal from the input fan-out unit to an optical splitter in the splitter container (block 708). For example, input cable 608 may convey the optical signal from fan-out unit 610 to optical splitter 606. Input cable 608, as illustrated in FIG. 6A, may not include fiber loop slack.

The optical splitter may split the optical signal into multiple optical signals (block 710). For example, in FIG. 6A, the optical signal may enter optical splitter 606 via input cable 608. Input cable 608 may be connected to fiber array 624 that aligns the optical fiber in input cable 608 to waveguides in substrate 620. The waveguides may split the optical signal into multiple optical signals and output the multiple optical signals to optical fibers in ribbon cable segments 614. The optical fibers in ribbon cable segments 614 may be aligned to the waveguides by fiber array 616.

Ribbon cables may route the multiple optical signals from the optical splitter to an output fan-out unit (block 712). For example, ribbon cables 604 and ribbon cable segments 614 may convey the multiple optical signals to output fan-out unit 602.

The fan-out unit may route the optical signals through the fan-out unit to ribbon cables (block 714). For example, in one implementation, fan-out unit 602 may receive optical signals from eight 4-fiber ribbon cable segments (e.g., ribbon cables 604) and output optical signals via two 12-fiber ribbon cables (e.g., ribbon cables 408-1 and 408-2) and one 8-fiber ribbon cable (e.g., ribbon cable 408-3).

The ribbon cables may route the optical signals to connectors (block 716). For example, two 12-fiber ribbon cables and one 8-fiber ribbon cable (e.g., ribbon cables 408-1, 408-2, and 408-3) may route the optical signals to connectors 410 (e.g., 12, 8, or 4 fiber MT-APC connectors).

The connectors may output the optical signals to distribution cables (block 718). For example, connectors 410 may output the optical signals to the distribution cables in distribution cable bundle 208. Connectors 410 may be mated, via adaptors, to connectors that are attached to distribution cables bundle 208.

The above describes process 700 associated with splitter module 302. As indicated in the preceding, optical splitter module 302 does not include an optical fiber loop slack. Such small splitter modules may be used in a space-efficient indoor fiber distribution hub, to save installation and optical fiber cabling cost (e.g., 40% savings in time/cost). In addition, splitter module designs with the smallest form factor may facilitate standardization of splitter module size, and may spur production of splitter modules that may be used in fiber distribution hubs from different vendors.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to the process illustrated in FIG. 7, the order of the blocks may be modified in other implementations. In addition, non-dependent blocks may represent blocks that can be performed in parallel.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    an input cable for receiving optical signals from a feeder cable;
    output cables for transmitting optical signals to a distribution cable; and
    a housing, including:
        an optical splitter for splitting an input beam into a plurality of output beams;
        an input fiber segment for conveying the input beam from the input cable to the optical splitter, the input fiber segment excluding fiber loop slack;
        output fiber segments for conveying the output beams from the optical splitter to the output cables;
        a stress absorbing unit attached to the optical splitter and configured to guide first portions of the output cables toward an inside wall of the housing, and protect the first portions of the output cables against bending at angles that cause damage to the output fiber segments, the first portions of the output cables being inside the housing; and
        an output fan-out unit configured to connect the first portions of the output cables to second portions of the output cables and affix the first portions of the output cables to the housing such that pulling at the second portions does not detach the output fiber segments from the optical splitter.

2. The device of claim 1, further comprising:
    a subscriber connector-angle polished connector (SC-APC) that terminates the input cable.

3. The device of claim 2, further comprising:
    mechanical transfer-angle polished connectors (MT-APCs) that terminate the output cables.

4. The device of claim 3, wherein the housing comprises a container that fits into an indoor fiber distribution hub that includes a panel for retaining the MT-APCs.

5. The device of claim 2, further comprising:
    a 12-fiber MT-APC that terminates at least one of the output cables; or
    an 8-fiber MT-APC that terminates at least one of the output cables.

6. The device of claim 1, wherein the optical splitter includes a plane lightwave circuit (PLC) optical splitter.

7. The device of claim 1, wherein the optical splitter includes waveguides that receive the input beam, split the input beam into the output beams, and transmit the output beams.

8. The device of claim 7, wherein the optical splitter includes:
- a first fiber array that aligns the input fiber segment to an input to the waveguides;
- a substrate that includes the waveguides; and
- a second fiber array that aligns the output fiber segments to outputs of the waveguides.

9. The device of claim 1, wherein the output fan-out unit includes epoxy-based material.

10. The device of claim 1, wherein the output fiber segments includes M optical fiber segments arranged in N ribbon cables.

11. The device of claim 10, wherein the M optical fiber segments include 16, 32, or 64, optical fiber segments, and wherein the N ribbon cables includes 4 or 8 ribbon cables.

12. The device of claim 10, wherein the output cables includes M optical fibers arranged in K ribbon cables.

13. The device of claim 12, wherein one of the K ribbon cables includes a 12-fiber ribbon cable or an 8-fiber ribbon cable.

14. The device of claim 1, wherein the distribution cable includes one or more ribbon cables, each ribbon cable encasing 4, 8, 12, 16, 20, 24, 28, or 32 optical fibers.

15. A method comprising:
- receiving an optical signal from a feeder cable at a connector;
- routing the optical signal from the connector to a splitter inside a splitter container via an optical fiber cable, the optical fiber not including a fiber loop;
- splitting, at the splitter, the optical signal into a plurality of optical signals;
- routing the plurality of optical signals from the splitter to connectors via ribbon cables, the ribbon cables not including any fiber loop;
- outputting the plurality of optical signals from the connectors;
- preventing the ribbon cables from bending at angles that damage optical fibers inside the ribbon cables via a stress absorbing unit that is attached to the splitter and guides the ribbon cables from the splitter to a wall of the splitter container; and
- affixing the ribbon cables to the wall of the splitter container via a fan-out unit such that pulling at the ribbon cables does not detach the optical fibers from the splitter, the fan-out unit regrouping the optical fibers in the ribbon cables.

16. The method of claim 15, further comprising:
- rearranging optical fibers that carry the plurality of optical signals from the splitter into N groups of optical fibers, each group of optical fibers encased in one of the ribbon cables.

* * * * *